United States Patent [19]

Choo

[11] Patent Number: 5,745,327

[45] Date of Patent: Apr. 28, 1998

[54] DEVICE FOR PREVENTING SURGE NOISE IN CONNECTING COMPUTERS AND PERIPHERALS THEREOF

[75] Inventor: Youn-Chul Choo, Suwon, Rep. of Korea

[73] Assignee: SamSung Electronics Co., Ltd., Suwon, Rep. of Korea

[21] Appl. No.: 656,809

[22] Filed: Jun. 3, 1996

[30] Foreign Application Priority Data

Jun. 2, 1995 [KR] Rep. of Korea ............... 14627/1995

[51] Int. Cl.$^6$ .................................................. H02H 3/00
[52] U.S. Cl. ........................... 361/111; 361/58; 361/119
[58] Field of Search .............................. 361/58, 111, 119, 361/90, 101

[56] References Cited

U.S. PATENT DOCUMENTS

| | | | |
|---|---|---|---|
| 4,677,519 | 6/1987 | Rodriguez et al. | 361/101 |
| 4,772,979 | 9/1988 | Arras | 361/90 |
| 4,831,484 | 5/1989 | Bruch | 361/101 |
| 5,272,584 | 12/1993 | Austruy | 361/58 |
| 5,300,765 | 4/1994 | Mizuta | 361/101 |
| 5,555,510 | 9/1996 | Verseput | 361/58 |

Primary Examiner—Jeffrey A. Gaffin
Assistant Examiner—Stephen Jackson
Attorney, Agent, or Firm—Robert E. Bushnell, Esq.

[57] ABSTRACT

A circuit that protects electronic components from damage caused by current and voltage surges generated on signal or data transmission lines when an electrically energized host device is connected to or disconnected from a peripheral device. The circuit uses transistor elements to switch off or interrupt the signal or data transmission line thus protecting circuit elements from damage. The protective circuit is enabled automatically whenever the connection of ground pins between the peripheral and the host fails to be established, as opposed to enabling the protective circuit when a voltage surge or a current surge is detected by a circuit element. When the ground pins between peripheral and host are finally connected, the circuit automatically responds by allowing data and signals to be transmitted between the host and the peripheral. The circuit accomplishes these tasks by having transistor switching circuits to connected to the transmission lines and by having transistor elements that automatically sense whether or not the ground pins between periphery and host are joined.

23 Claims, 2 Drawing Sheets

DEVICE FOR PREVENTING SURGE NOISE IN CONNECTING COMPUTERS AND PERIPHERALS THEREOF

CROSS-REFERENCE TO RELATED APPLICATIONS

This application makes reference to, incorporates the same herein, and claims all benefits accruing under 35 U.S.C. §119 arising from an application for a *Device for Preventing Surge Noise in Connecting Computers and Peripherals Threrof* earlier filed in the Korean Industrial Property Office on 2 Jun. 1995 and there duly assigned Ser. No. 14627/1995.

FIELD OF THE INVENTION

The present invention relates to a device for preventing surge noise in connecting computers and peripherals thereof more particularly, a device for protecting a circuit from a surge voltage when a signal wire before a ground wire is connected when a peripheral is being attached to a host computer.

BACKGROUND OF THE INVENTION

Generally, the electric signal between a computer and peripheral thereof, that is, data have a power source and a reference space (e.g., zero Volts) of which potential difference determines a transmitting/receiving level. The reference value of a power source may be variable when the ground circumstances of a computer and peripheral thereof are different from each other. The internal circuitry of a computer is damaged by a sudden surge of current when a signal wire is connected before a ground wire is connected while electrically connecting a computer and peripheral together.

To solve this problem, one recent effort suggested that the ground wire of a connector connecting the computer and peripheral together be made longer than the signal wire; this is described in Korean Pat. No. 94-34408 filed on Dec. 15, 1994, entitled *A Surge Voltage Preventing D-sub Connector*. In cases where the ground wire is not made longer than the signal wire, the signal wire is more apt to connect before the ground wire, making expensive circuit components vulnerable to destructive voltage and current surges. Other efforts have developed circuits that purport to sense voltage and current surges and then turn off the data line to protect the expensive circuit components until the surge has dissipated. These circuits contain transistors to interrupt the data line until the current or voltage surge passes.

For example, U.S. Pat. No. 4,772,979 for a *Voltage Shock Protection Circuit* to Arras uses two FET transistor elements connected in series on a signal line. These FET transistor elements are switched on or off by a bipolar transistor. A voltage sensing circuit is used to sense a voltage surge. When a surge is sensed, the FET transistors interrupt a signal line by being driven into cut-off by the bipolar transistor.

U.S. Pat. No. 5,300,765 for a *Memory Card with Latch-up Protection* to Mizuta endeavours to provide a circuit for protecting memory cards from latching when connected to a host computer. An overcurrent detecting circuit detects for the presence of a current surge. When a surge has been detected, the current into the base of these transistors shuts off, causing the current in the lines connected to the collected and emitter of these transistors to be turned off, and thereby protecting circuit elements along this line from current surges. Other examples include U.S. Pat. No. 4,831,484 for an *Electrical Safety Barrier for Protection of Electrical Load Elements Placed in Potentially Hazardous Locations* to Bruch and U.S. Pat. No. 4,677,519 for a *Short-Circuit Protected Mains Supply Unit, Especially for Television Receivers* to Rodriguez et al. Generally, these recent efforts have also used the switch characteristics of transistors to protect circuit elements from current and voltage surges when a peripheral is attached to an electrically energized host appliance. I have discovered that the use of transistors to interrupt or switch off a portion of a circuit to protect circuit elements from current and voltage surges does not itself enable a circuit to automatically interrupt a connection when the ground pins of the peripheral and the host fail to connect. Instead, I have found that contemporary designs trigger the interrupting circuit only upon the detection of a current or voltage surge, rather than not upon the connection of signal or data pins before the connection of ground pins.

SUMMARY OF THE INVENTION

It is object of the recent invention to provide an improved process and circuit for minimizing damage to components of the circuit caused by electrical surges.

It is another object to provide a process and circuit for preventing electrical component damage caused by surge noise when connecting a host computer to a computer peripheral, more particularly, a circuit for protecting electrical components from being harmed by surges of voltages and surges of currents produced when the signal lines of a peripheral are connected to the signal lines of a host before the ground lines are connected.

It is yet another object to provide a circuit that protects circuit components from damage caused by voltage and current surges produced when a peripheral electrical device is being attached to or detached from an electrically energized host device, where the protective circuit is enabled automatically when the data lines are connected before the ground lines are connected.

It is still another object to provide a circuit that interrupts a data or signal transmission line automatically when a peripheral electrical device is being joined to an electrically energized host device and the ground pins of each device fail to connect.

It is also an object to provide a preventative, built-in safety circuit that protects electrical components from voltage and current surges by interrupting data or signal transmission lines automatically whenever the circuits are not grounded properly before any voltage or current surges can be detected.

These and other objects may be achieved by a transistor switching circuit connected to a data or signal transmission line whose operative state is determined by whether or not the ground pins of the peripheral device have connected to the ground pins of the host device. If the ground pins of both devices are connected, a triggering transistor is switched off, causing two additional transistors connected to a data transmission line to switch on to an electrically conductive state enabling data to flow between host and peripheral, and vice versa, along the transmission line. If the ground pins between host and peripheral are not connected when the data or signal pins are connected, a triggering transistor is switched on causing two transistors on the transmission line to be switched off, causing an interruption in transmission between periphery and host on the transmission line until the ground pins can be connected.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Circuits are presented that enable a peripheral device to be connected to an electrically energized host device while protecting the circuit components from damage caused by current and voltage surges. The circuits are located on either a signal transmission line or a data transmission line between a computer host device and a peripheral device. The circuits switch off a transmission line whenever the ground terminal of the peripheral fails to connect to the ground terminal of the host computer. The result is that electrical components along the transmission line are protected against the possibility of destruction caused by a current or voltage surge generated during the insertion process.

Figure 1:
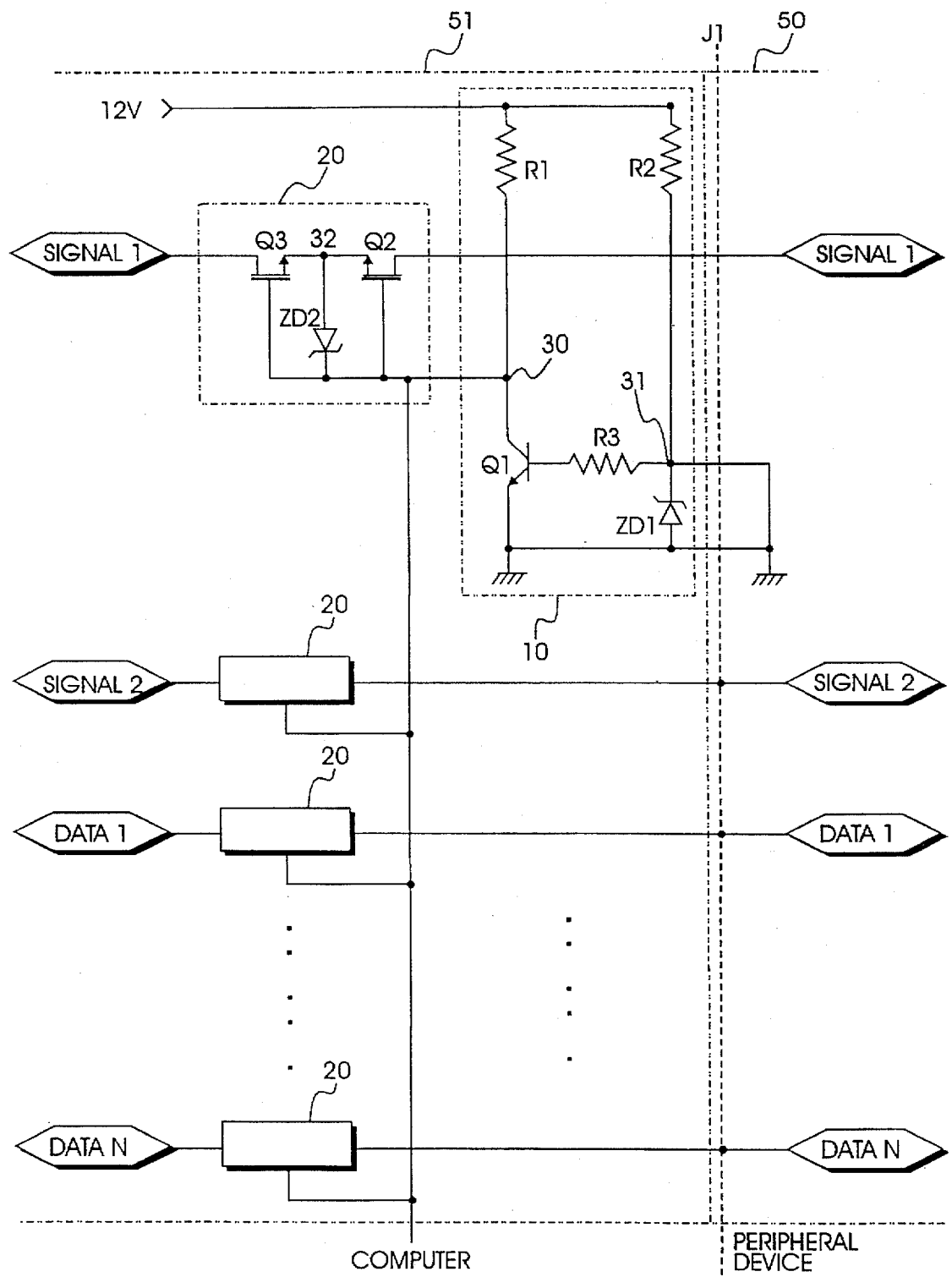
FIG. 1 is a detailed circuit diagram of a device for preventing surge noise in connecting computers and peripherals thereof in accordance with a first embodiment of the present invention.

The first circuit is disclosed by the first embodiment of the present invention, and is shown in FIG. 1. Two field effect transistors and one bipolar transistor is used to in this first embodiment as shown in FIG. 1. FIG. 1 shows transmission path forming means 10 with resistor R1 connected between a DC power supply internal to the host computer and node 30, resistor R2 connected between the DC power supply and node 31, bipolar transistor Q1 with the collector connected to node 30 and the emitter connected to ground, and resistor R3 connected between node 31 and the base of transistor Q1. FIG. 1 also shows a signal transmission means 20 with FET transistors Q2 and Q3 connected to the first signal transmission line between the host computer and the peripheral device. In particular, the gate of transistor Q2 is connected to node 30, the drain of transistor Q2 is connected to the signal terminal of the peripheral device, the gate of transistor Q3 is also connected to node 30, the drain of Q3 is connected to the first signal terminal of the host computer, and the source of Q2 is connected to the source of Q3 at node 32. The circuit also contains two Zener diodes ZD1 And ZD2. The cathode of ZD1 is connected to node 31, while the anode of ZD1 is connected to computer ground. ZD1 insures that a uniform current enters the base of Q1 when the peripheral ground is not connected to the host computer ground. The cathode of ZD2 is connected to node 30 while the anode of ZD2 is connected to node 32. ZD2 insures a uniform voltage between sources and gates of transistors Q2 and Q3.

The circuit in FIG. 1 operates in the following manner. Although the circuit in FIG. 1 is shown to be connected to a first signal transmission line, it is understood that the same circuit can be applied to any of the other signal transmission lines or any of the data transmission lines that are established between a host computer and a peripheral device. When peripheral device 50 is connected to electrically energized host computer 51, signal pins, data pins and a ground pin of peripheral 50 are connected to the corresponding signal pins, data pins, and ground pin of the host computer 51. The risk of destructive current or voltage surges becomes present when any the data terminals or signal terminals connect before the ground terminals connect. In the case where the signal transmission line between the first signal terminals between host 51 and peripheral 50 are connected before the ground terminals are joined, node 31 in FIG. 1 is not connected to ground. When node 31 is not grounded, current from the 12 volt DC power source in the host computer 51 flows through resistors R2 and R3, and then through the forward biased PN junction between the base and the emitter of transistor Q1 to ground. Thus, a current flows into the base terminal of transistor Q1 turning transistor Q1 on to a conductive state. This, in turn, causes a current to flow from collector to emitter in transistor Q1. This collector to emitter current flows from the 12 volt power supply of the host computer and through resistor R1. Because the collector to emitter current flows through resistor R1, node 30 is pulled to a much lower potential than if there was no current in resistor R1. As a result, the potential at the gates of transistors Q2 and Q3 falls, causing transistors Q2 and Q3 to switch into a non-conductive mode. When transistors Q2 and Q3 are in a non-conductive mode, current is not allowed to flow between source and drain of transistors Q2 and Q3, thus prohibiting data, signals, current surges, and voltage surges from travelling across the first signal transmission line between the first signal terminal of the peripheral and the first signal terminal of the host computer. As a result, electrical components connected to the first signal transmission line are protected from current and voltage surges generated during the attachment process of the peripheral device to the host computer.

Should the ground terminals of peripheral device 50 subsequently be connected to the ground terminal of host computer 51, node 31 is grounded. With node 31 grounded, no current flows into the base of transistor Q1, causing transistor Q1 to switch to a non-conductive state. In the non-conductive state, transistor Q1 has no current flowing from collector to emitter terminals. As a result, no current flows through resistor R1, resulting in node 30 having a potential equal to the power supply of 12 DC volts. This high potential at the gates of transistors Q2 and Q3 causes transistors Q2 and Q3 to switch into a conductive state, causing signals to be transmitted along the signal transmission line between the first signal terminal of the host computer and the first signal terminal of the peripheral device. Thus, normal operation is resumed when the ground terminals between host 51 and peripheral 50 finally are joined as is represented by Table 1.

TABLE 1

SWITCHING STATES FOR BOTH CIRCUITS

| Signal/Data pins line | Ground pins | Q1(4) | Q2(5) | Q3(6) | Mode of transmission |
|---|---|---|---|---|---|
| Disconnected | Disconnected | on | off | off | transmission lines not connected |
| Disconnected | Connected | on | off | off | transmission lines not connected |
| Connected | Disconnected | on | off | off | Protective mode, no transmission allowed |
| Connected | Connected | off | on | on | normal mode-signals and data may be sent |

The above circuit of FIG. 1 can be repeated for each signal or data transmission line formed between the peripheral and the host. The circuit will protect electrical components connected to these transmission lines from damage during attachment.

It should be noted that the above circuit does not sense a voltage or a current surge before interrupting or shutting off a transmission line. Instead, the above circuit automatically interrupts or shuts off a transmission line whenever the pins of the transmission line of the peripheral are connected to the corresponding pins of the transmission line of the host before the ground pins between host and peripheral are connected. No voltage surge or current surge is needed to cause the circuit to switch into the protective mode as is represented by FIG. 1.

Figure 2:
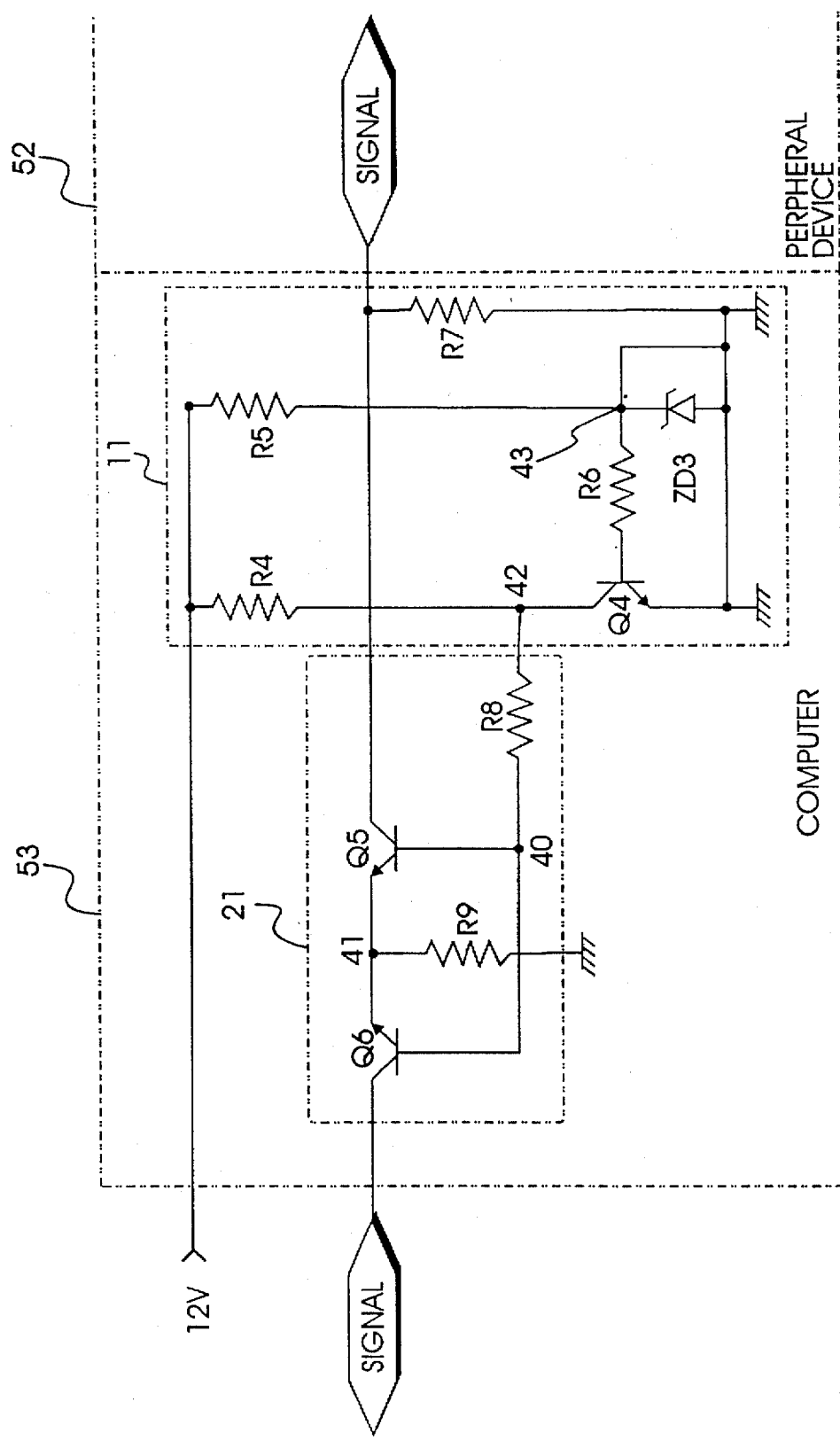
FIG. 2 is a detailed circuit diagram of a device for preventing surge noise in connecting computers and peripherals thereof in accordance with a second embodiment of the present invention.

The second circuit is shown in FIG. 2, depicting the circuit for the second embodiment of the present invention. Unlike the first embodiment, the second embodiment uses only bipolar transistors. The concept for operation is similar. A transmission path forming means 11 has resistor R4 connected between the DC power supply of the host computer and node 42, resistor R5 connected between the DC power supply and node 43, bipolar transistor Q4 with an emitter terminal connected to ground, a collector terminal connected to node 42, resistor R6 is connected between the base terminal of Q4 and node 43, and cathode of Zener diode ZD3 connected to node 43, while the anode is connected to ground. Meanwhile, signal transmission means 21 has resistor R8 connected between node 42 and node 46, transistors Q5 and Q6 connected to the transmission line, with the bases of Q5 and Q6 connected to node 46, emitters of Q5 and Q6 connected to node 41 on the transmission line, the collector of Q5 connected to the signal terminal of the data transmission line, and the collector of Q6 connected to the signal terminal of the host computer. Resistor R9 is connected between node 41 on the transmission line and ground. Resistor R7 is connected between the signal terminal of the peripheral device and ground of the peripheral device.

The circuit in FIG. 2 goes into a protective mode whenever the signal transmission pins are connected between peripheral 52 and host 53 and the ground pins are not connected between peripheral 52 and host 53. In such a scenario, node 43 is not connected to ground. As a result, current flows from the 12 volt DC power source in the host computer through resistor R5 to node 43, and then through resistor R6 and into the base of transistor Q4. This causes transistor Q4 to switch on, causing a current to flow between the collector and the emitter of transistor Q4. The potential at node 42 at the collector terminal of transistor Q4 becomes low, resulting in no current flowing to the bases of transistors Q5 and Q6 on the transmission line. As a result, transistors Q5 and Q6 are shut off, preventing any current surges, voltage surges, signals, or data from being transmitted across the transmission line between the host and the peripheral. See Table 1. Thus, the circuit is in a protective mode, protecting components from the possibility of being harmed by any voltage or current surges which could develop during insertion.

Should the ground terminals of peripheral 52 and host 53 later become connected, the circuit in FIG. 2 will switch back into a normal operational mode allowing signals and data to be transmitted between peripheral and host over the transmission line. When the ground terminals between host 53 and peripheral 52 are connected, node 43 is grounded, causing no current to flow into the base terminal of transistor Q4. As a result, transistor Q4 is switched off, resulting in no current flowing between the collector and the emitter of Q4. As a result, a current begins to flow from the 12 volt DC power supply, through resistor R4 to node 42, and then through resistor R8 to node 46, through the bases of transistors Q5 and Q6 to node 41 at the emitters, and then through resistor R9 to ground. This current to the base of transistors Q5 and Q6 causes transistors Q5 and Q6 to conduct currents between the collectors and emitters on the transmission line. As a result, signals and data are allowed to flow between peripheral and host along the transmission line when the ground pins between host and peripheral are joined, as is shown by Table 1.

What is claimed is:

1. A device for preventing surge noise in connecting a computer and a peripheral of the computer, comprising:

transmission path forming means connected to an internal power source and a ground wire of a peripheral device, for alternatively forming and interrupting a signal transmitting path only when said signal transmitting path between said peripheral and said computer is electrically connected and a ground connecting path between said computer and said peripheral is not electrically connected, thereby establishing an operational state of the signal transmitting path; and signal transmission means for transmitting a signal between the computer and the peripheral device in accordance with the operational state of the signal transmitting path.

2. The device of claim 1, coupled to all connected signal lines in between the computer and the peripheral device.

3. The device of claim 1, wherein said transmission path forming means comprises:

a first and a second resistors each having a first terminal connected to an internal power source of the computer;

a third resistor having a first terminal grounded;

a first transistor having a collector electrode connected to a second electrode of said first resistor, an emitted electrode grounded, and a base electrode connected to a second electrode of said third resistor; and a first Zener diode having an anode grounded and a cathode connected in common to a second electrode end of said second resistor and said third resistor.

4. The device of claim 1, wherein said signal transmission means comprises:

a first and a second transistor forming a signal path between the computer and the peripheral device in accordance with said voltage difference value; and a Zener diode maintaining a constant voltage to gate electrodes and source electrodes of said first and said second transistors.

5. The device of claim 4, comprised of said first and said second transistors being field effect transistors.

6. The device of claim 1, comprising:

said transmission path forming means comprising:

a first resistor having a first terminal connected to an internal power source port of a computer;

a second resistor having a first terminal connected to said first terminal of said first resistor;

a first transistor having a collector electrode connected to a second electrode of said first resistor and an emitter electrode that is grounded;

a first Zener diode having an anode that is grounded and a cathode that is connected to a second terminal of said second resistor;

a third resistor having a first terminal connected to a base electrode of said first transistor and a second terminal connected across said cathode and said anode of said Zener diode;

a fourth resistor R7 having a first terminal grounded and a second terminal connected to a signal wire of the peripheral device;

said signal transmission means comprising:

a second and third transistor forming said signal path between the computer and the peripheral device by said operational states of said transmission path forming means;

a fifth resistor having a first terminal connected to an emitter electrode of said second transistor and a second terminal grounded; and a sixth resistor having a first terminal connected to both base electrodes of said second and said third transistors.

7. A circuit for safely connecting an electrically energized computer having a DC power supply and having at least one signal terminal and a ground terminal to a peripheral device having at least one signal terminal and a ground terminal, said circuit comprising:

a first resistor having first and a second terminals, said second terminal being connected to said DC power supply of said computer;

a second resistor having first and a second terminals, said second terminal being connected to said DC power supply of said computer;

a third resistor having first and a second terminals, said second terminal being connected to said first terminal of said second resistor;

a first transistor having a control terminal and first and second terminals, said control terminal being connected to said first terminal of said third resistor, said first terminal being connected to said first terminal of said first resistor, and said second terminal being connected to said ground terminal of said computer;

a second transistor, having a control terminal and first and second terminals, said control terminal being connected to said first terminal of said first transistor and said first terminal being connected to one of said at least one signal terminal of said peripheral device; and a third transistor having a control terminal and first and second terminals, said control terminal being connected to said first terminal of said first transistor, said second terminal being connected to said second terminal of said second transistor, and said first terminal being connected to one of said at least one signal terminal of said computer, wherein said second and said third transistors interrupt a signal transmission line formed between said signal terminal of said peripheral device and said signal terminal of said computer device when said signal transmission line between said peripheral device and said computer device is connected and said ground terminal of said peripheral device is disconnected from said ground terminal of said computer device.

8. The circuit of claim 7, wherein said first transistor is a bipolar transistor having base, collector, and emitter terminals, said control terminal being said base terminal and said first and second terminals being said collector and said emitter terminals respectively, and said second and said third transistors are both field effect transistors, each having source, drain, and gate terminals, said control terminal being said gate terminal and said first and second terminals being said drain and source terminals respectively.

9. The circuit of claim 7, further comprising:

a first Zener diode having anode and cathode terminals, said cathode terminal being connected to said second terminal of said third resistor and said anode terminal being connected to said ground line of said computer, said Zener diode provides said base terminal of said first transistor with a constant current whenever said signal line is connected before said ground terminals are connected between said peripheral and said computer device.

10. The circuit of claim 7, further comprising:

a second Zener diode having anode and cathode terminals, said anode terminal being connected to said source of said second transistor and said cathode terminal being connected to said collector of said first transistor, said second Zener diode maintaining a constant voltage between said gate and source terminals of said second and third transistors.

11. The circuit of claim 7, wherein when said ground terminal of said computer device is connected to said ground terminal of said peripheral device, said second terminal of said third resistor is grounded causing said first transistor to stop conducting, causing said second and third transistors to conduct, allowing signals to be transmitted between said peripheral device and said computer device along said signal transmission line.

12. The circuit of claim 7, wherein when one of said at least one signal terminal of said peripheral device and one of said at least one signal terminal of said computer device are connected and said ground terminal of said computer device is electrically isolated form said ground terminal of said peripheral causing a current to flow into said base terminal of said first transistor causing current to flow from collector to emitter of said first transistor causing conduction between said respective drain and said source of each of said second and said third transistors to cease, causing said signal line between said peripheral device and said computer device to be interrupted, thereby preventing transmission of signals between said computer device and said peripheral device.

13. A circuit for safely connecting an electrically energized computer having a DC power supply and having at least one signal terminal and a ground terminal to a peripheral device having at least one signal terminal and a ground terminal, said circuit comprising:

a first resistor having first and second terminals, said first terminal being connected to said DC power supply of said computer;

a second resistor having first and second terminals, said first terminal being connected to said DC power supply of said computer;

a third resister having first and second terminals, said second terminal being connected to said second terminal of said second resistor;

a first transistor having a control terminal and a first and a second terminal, said control terminal being connected to said first terminal of said third resistor, said first terminal being connected to said second terminal of said first resistor, and said second terminal being connected to said ground terminal of said computer;

a fourth resistor having first and second terminals, said first terminal being connected to said ground terminal of said peripheral and said second terminal being connected to one of said at least one signal terminal of said peripheral;

an fifth resistor having first and second terminals, said second terminal being connected to said first terminal of said first transistor;

a second transistor having a control terminal and a first and a second terminal, said control terminal being connected to said first terminal of said fifth resistor, said first terminal being connected to one of said at least one signal terminal of said peripheral device;

a third transistor having a control terminal and a first terminal and a second terminal, said first terminal being connected to said first terminal of said fifth resistor, said second terminal being connected to said second terminal of said second transistor, and said first terminal being connected to one of said at least one signal terminal of said computer; and a sixth resistor having first and second terminals, said first terminal being connected to said second terminal of said third transistor, said second terminal connected to said ground terminal of said computer, wherein said second and said third transistors interrupt a signal transmission line formed between said signal terminal of said peripheral device and said signal terminal of said computer device when said signal transmission line between said peripheral device and said computer device is connected and said ground terminal of said peripheral device is disconnected from said ground terminal of said computer device.

14. The circuit of claim 13 wherein said first, said second, and said third transistors are all bipolar transistors and said control terminals of said first, second, and third transistors are base terminals and said first terminals of said first, second, and third transistors are collector terminals and said second terminals of said first, second, and third transistors are all emitter terminals.

15. The circuit of claim 13, further comprising:

a third Zener diode having cathode and anode terminals, said cathode terminal being connected to said second terminal of said third resistor and said anode terminal being connected to said ground terminal of said computer.

16. The circuit of claim 13, wherein when said ground terminal of said computer is connected to said ground terminal of said peripheral, said second terminal of said third resistor is grounded causing said first transistor to stop conducting, causing said second and third transistors to begin to conduct, allowing signals to be transmitted between said peripheral device and said computer device along said signal transmission line formed between said signal terminal of said periphery at least one signal terminal of said peripheral device and one of said at least and said signal terminal of said computer.

17. The circuit of claim 13, wherein when one of said one signal terminal of said computer device are connected and said ground terminal between said computer device and said peripheral device are disconnected, said circuit causes a current to flow into said base terminal of said first transistor causing current to flow from collector to emitter of said first transistor causing said second and third transistors to cease conducting current between the respective sources and drains of said second and third transistors, causing said signal transmission line formed between said signal terminal of said periphery and said signal terminal of said computer to be interrupted, preventing the transmission of signals, current surges or voltages surges along said signal transmission line.

18. A circuit, comprising:

a host device having a plurality of ground terminals and a plurality of signal terminals;

a peripheral device having a plurality of ground terminals and a plurality of signal terminals; and data transmission means for interrupting data transmission between one of said signal terminal of the host and one of said signal terminal of the peripheral device only when one of said plurality of said signal terminals of said peripheral device is connected to one of said plurality of said signal terminals of said host device before one of said plurality of ground terminals of said peripheral device is connected to one of said plurality of ground terminals of said host device.

19. The circuit of claim 18, wherein said data transmission means enables said data transmission between said one of said signal terminal of the host and said one of said signal terminal of the peripheral device, said data transmission means responding to said signal by enabling said data transmission when said ground terminal of the peripheral device is electrically connected to said ground terminal of the host.

20. The circuit of claim 18, wherein said interrupting of said data transmission between said one of said signal terminal of the peripheral device and said one of said signal terminal of the host device protects electrical components including memory chips from damage caused by voltage surges and current surges.

21. A device for preventing surge noise in connecting a computer and a peripheral of the computer, comprising:

transmission path forming means connected to an internal power source and a ground wire of a peripheral device, for alternatively forming and interrupting a signal transmitting path according to a voltage difference value occurring during electrical connection of the computer and the peripheral device, thereby establishing an operational state of the signal transmitting path; and signal transmission means for transmitting a signal between the computer and the peripheral device in accordance with the operational state of the signal transmitting path, wherein said transmission path forming means comprises:
- a first and a second resistors each having a first terminal connected to an internal power source of the computer;
- a third resistor having a first terminal grounded;
- a first transistor having a collector electrode connected to a second electrode of said first resistor, an emitted electrode grounded, and a base electrode connected to a second electrode of said third resistor; and
- a first Zener diode having an anode grounded and a cathode connected in common to a second electrode end of said second resistor and said third resistor.

22. A device for preventing surge noise in connecting a computer and peripheral of the computer, comprising:
  transmission path forming means being connected to an internal power source and a ground wire of a peripheral device, and forming and interrupting a signal transmitting path according to a voltage difference value occurring during electrical connection of a computer and the peripheral device; and
  signal transmission means for transmitting a signal between the computer and the peripheral device in accordance with the operational states of an electrically completed said signal transmitting path and an electrically interrupted said signal transmitting path, wherein said signal transmission means comprises:
  - a first and a second transistor forming a signal path between the computer and the peripheral device in accordance with said voltage difference value; and
  - a Zener diode maintaining a constant voltage to gate electrodes and source electrodes of said first and said second transistors.

23. The device of claim 22, comprised of said first and said second transistors being field effect transistors.

* * * * *